US012106751B2

(12) United States Patent
Tholfsen et al.

(10) Patent No.: US 12,106,751 B2
(45) Date of Patent: Oct. 1, 2024

(54) AUTOMATIC SPEECH SENSITIVITY ADJUSTMENT FEATURE

(71) Applicant: Microsoft Technology Licensing, LLC, Redmond, WA (US)

(72) Inventors: Michael Tholfsen, Newcastle, WA (US); Paul Ronald Ray, Kirkland, WA (US); Daniel Edward McAllister, Bellevue, WA (US); Hernán David Maestre Piedrahita, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 114 days.

(21) Appl. No.: 16/555,845

(22) Filed: Aug. 29, 2019

(65) Prior Publication Data
US 2021/0065691 A1 Mar. 4, 2021

(51) Int. Cl.
G10L 15/187 (2013.01)
G10L 15/22 (2006.01)
G10L 15/30 (2013.01)

(52) U.S. Cl.
CPC ............ G10L 15/187 (2013.01); G10L 15/22 (2013.01); G10L 15/30 (2013.01)

(58) Field of Classification Search
USPC ............................. 704/251, 231; 707/1–504
See application file for complete search history.

(56) References Cited

U.S. PATENT DOCUMENTS 5,791,904 A * 8/1998 Russell ................. G10L 15/142
434/167
7,103,542 B2 * 9/2006 Doyle ..................... G10L 15/01
704/235

(Continued)

FOREIGN PATENT DOCUMENTS

CN 102568475 B 11/2014
JP H05265482 A 10/1993
WO 2016067644 A1 5/2016

OTHER PUBLICATIONS

Bidasaria, Gaurav, "Top 5 Android Apps to Learn English Pronunciation", Retrieved from https://www.guidingtech.com/android-apps-learn-english-pronunciation/, Oct. 12, 2018, 8 Pages.

(Continued)

Primary Examiner — Marcus T Riley

(57) ABSTRACT

An automatic speech sensitivity adjustment feature is provided. The described sensitivity feature can enable an automatic system adjustment of a sensitivity level based on the number and type of determined speech errors. The sensitivity level determines how sensitive the sensitivity feature will be when indicating speech errors. The sensitivity feature can receive audio input comprising one or more spoken words and determine speech errors for the audio input using at least a sensitivity level. The sensitivity feature can determine whether an amount and type of the speech errors requires an adjustment to the sensitivity level. The sensitivity feature can adjust the sensitivity level to a second sensitivity level based on the amount and type of the speech errors, where the second sensitivity level is a different level than the sensitivity level. The sensitivity feature can re-determine the speech errors for the audio input using at least the second sensitivity level.

20 Claims, 12 Drawing Sheets

(56) References Cited

U.S. PATENT DOCUMENTS

| | | | | |
|---|---|---|---|---|
| 7,668,710 | B2* | 2/2010 | Doyle | G10L 15/01 704/231 |
| 9,330,664 | B2* | 5/2016 | Huang | G10L 15/20 |
| 9,620,104 | B2* | 4/2017 | Naik | G10L 13/027 |
| 10,269,343 | B2* | 4/2019 | Wingate | G10L 15/22 |
| 10,332,315 | B2* | 6/2019 | Samec | G06T 19/006 |
| 10,586,540 | B1* | 3/2020 | Smith | G06F 3/165 |
| 10,789,041 | B2* | 9/2020 | Kim | G06F 3/165 |
| 11,138,975 | B2* | 10/2021 | D'Amato | G10L 15/1822 |
| 2003/0125945 | A1* | 7/2003 | Doyle | G10L 15/01 704/E15.002 |
| 2005/0171775 | A1* | 8/2005 | Doyle | G10L 15/01 704/250 |
| 2006/0057545 | A1* | 3/2006 | Mozer | G09B 5/06 434/156 |
| 2006/0115800 | A1 | 6/2006 | Daley | G09B 21/006 434/185 |
| 2007/0055514 | A1* | 3/2007 | Beattie | G10L 15/08 704/235 |
| 2008/0167868 | A1* | 7/2008 | Kanevsky | G10L 15/24 704/E15.041 |
| 2008/0300874 | A1* | 12/2008 | Gavalda | G09B 19/04 704/235 |
| 2017/0084274 | A1* | 3/2017 | Kim | G10L 15/183 |
| 2017/0243577 | A1* | 8/2017 | Wingate | G10L 15/22 |
| 2017/0365101 | A1* | 12/2017 | Samec | G06T 19/006 |
| 2018/0165554 | A1* | 6/2018 | Zhang | G06N 3/045 |
| 2020/0395006 | A1* | 12/2020 | Smith | G10L 15/083 |
| 2020/0395010 | A1* | 12/2020 | Smith | G10L 15/1815 |
| 2021/0035561 | A1* | 2/2021 | D'Amato | G10L 15/22 |
| 2021/0035572 | A1* | 2/2021 | D'Amato | G06F 3/167 |
| 2021/0065691 | A1* | 3/2021 | Tholfsen | G10L 15/187 |

OTHER PUBLICATIONS

Fingas, Jon, "Google's Experimental Rivet App Helps Kids Learn to Read", Retrieved from https://www.engadget.com/2019/05/15/google-rivet-reading-app/, May 15, 2019, 2 Pages.

Jokisch, et al., "Pronunciation Learning and Foreign Accent Reduction by an Audiovisual Feedback System", in International Conference on Affective Computing and Intelligent Interaction, Oct. 22, 2005, 3 Pages.

"International Search Report and Written Opinion Issued in PCT Application No. PCT/US2020/037113", Mailed Date: Sep. 11, 2020, 13 Pages.

Communication pursuant to Article 94(3) Received for European Application No. 20750851.6, mailed on Nov. 3, 2023, 04 pages.

* cited by examiner

Application — □ X
≡ Home Insert Draw View Tools  Q Q Share

Owls are birds of prey. That means they hunt and eat other animals. Eagles, hawks, and falcons belong to that group too. But unlike most other birds of prey, owls are nocturnal — they are active at night. Their nighttime activity, quiet

Miscue Analysis

Total Words: 210

Number of Miscues: 21

Type of Miscue

Mispronunciation: 10

Insertion: 2

Omission: 4

Substitution: 5

FIG. 3C

AUTOMATIC SPEECH SENSITIVITY ADJUSTMENT FEATURE

BACKGROUND

Speech is a robust way to interact with a computing device. Speech capabilities may be added to user devices and applications to enable the use of voice commands, for example, to control the desktop user interface, dictate text in electronic documents and email, navigate websites, perform keyboard shortcuts, and to operate the mouse cursor. Speech tools are also beneficial in learning applications such that users of the learning applications can improve their speaking and reading skills.

BRIEF SUMMARY

An automatic speech sensitivity adjustment feature ("sensitivity feature") is provided. The described sensitivity feature can enable an automatic system adjustment of a sensitivity level based on the number and type of determined speech errors. The sensitivity level determines how sensitive the sensitivity feature will be when indicating speech errors.

The sensitivity feature can receive audio input comprising one or more spoken words and determine speech errors for the audio input using at least a sensitivity level. The sensitivity feature can determine whether an amount and type of the speech errors requires an adjustment to the sensitivity level. In response to the determination, the sensitivity feature can adjust the sensitivity level to a second sensitivity level based on the amount and type of the speech errors, where the second sensitivity level is a different level than the sensitivity level. The sensitivity feature can re-determine the speech errors for the audio input using at least the second sensitivity level.

A speech error is a mismatch between what a user intends to say and what the user actually says. In some cases, a speech error may be an oral reading miscue made while a user is performing an oral reading. In some cases, speech errors may be made while the user is using voice commands to control an aspect of a computing device, dictating text in the document or email, navigating websites, performing keyboard shortcuts, and operating a mouse cursor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 3A-3E illustrate example scenarios for applications with an automatic speech sensitivity level adjustment feature according to an embodiment of the invention.

DETAILED DESCRIPTION

Figure 1:
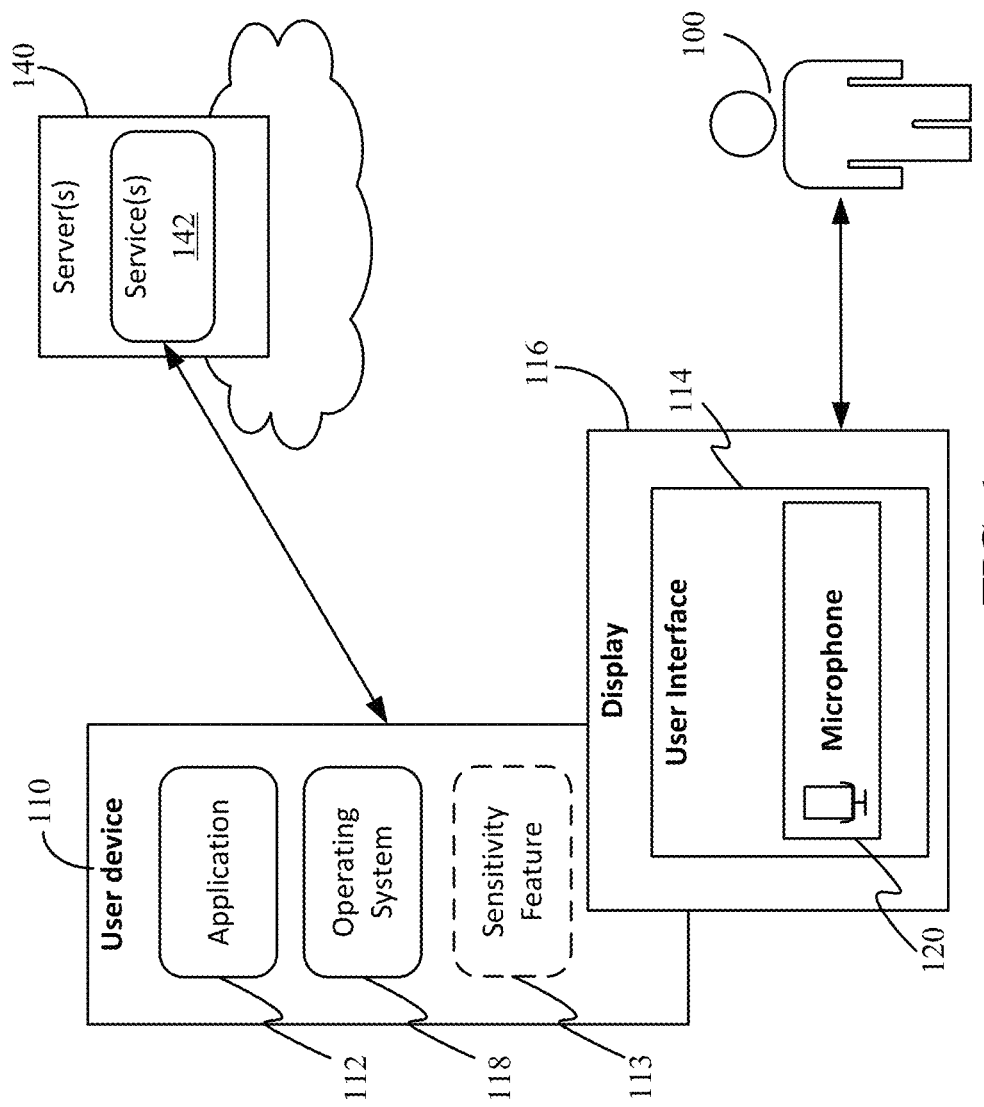
FIG. 1 illustrates an example operating environment in which various embodiments of the invention may be practiced.

An automatic speech sensitivity adjustment feature ("sensitivity feature") is provided. The described sensitivity feature can enable an automatic system adjustment of a sensitivity level based on the number and type of determined speech errors. The sensitivity level determines how sensitive the sensitivity feature will be when indicating speech errors.

A speech error is a mismatch between what a user intends to say and what the user actually says. In some cases, a speech error may be an oral reading miscue made while a user is performing an oral reading. In some cases, speech errors may be made while the user is using voice commands to control an aspect of a computing device, dictating text in the document or email, navigating websites, performing keyboard shortcuts, and operating a mouse cursor.

Examples of speech errors can include, but are not limited to, mispronunciation errors, repetition errors, insertion errors, substitution errors, omission errors, and hesitation errors. A spoken utterance may have more than one different type of speech error.

A mispronunciation error refers to an incorrect or inaccurate pronunciation of a spoken word or phoneme. A phoneme is a unit of sound that distinguishes one word from another in a particular language. A repetition error occurs when a user repeats one or more words in a row, where the repetition is not needed or expected in that circumstance. A substitution error occurs when one word is replaced with another word or when one sound is replaced with another sound. For example, a substitution error with respect to sound is when "w" is substituted for "r," so that "rabbit" sounds like "wabbit." An omission error occurs when a word in a sentence is omitted or when a sound in a word is omitted. For example, an omission error with respect to sound is when "bown ake" is said instead of "brown rake." An insertion error occurs when an extra word is inserted within an intended sentence or when an extra sound is inserted within a word. For example, an insertion error with respect to sound is when "buhlack horse" is said instead of "black horse." A hesitation error includes cadence inconsistencies such as pauses that create ambiguities in whether a word or sentence is complete. For example, partial word utterances such as "what" "err" instead of "water" can create ambiguities in the meaning of the utterance.

The described sensitivity feature may be included in a variety of applications. In some cases, the described sensitivity feature may be part of an education or learning application. For example, the sensitivity feature may be part of a reading application that provides an oral reading miscue analysis or reading error analysis.

A miscue refers to instances in oral reading when a reader reads a text in a way that the person listening would not expect. In the context of a miscue analysis, examples of speech miscues include speech errors including, but not limited to, substitution, insertion, hesitation, omission, correction, and repetition. A substitution miscue refers to when a reader substitutes incorrect words or phrases to replace the correct text. An insertion miscue refers to when the reader reads words that are not in the text. An omission miscue refers to when a reader does not read words that are in the text. A correction miscue refers to correcting and replacing words to their original form in the text. A repetition miscue refers to when readers reread the words or phrases in the text. A hesitation miscue refers to when a reader pauses in front of words in the text while reading.

As an example of incorporating the sensitivity feature in an education or learning application, if a user is orally reading for a reading miscue analysis while learning French and is mispronouncing almost every word, the sensitivity feature can adjust the sensitivity level and allow the system to be more lenient when performing the miscue analysis. For example, the system may only flag more egregious mispronunciations so that the user may slowly learn over time. Without the sensitivity feature, almost every word could be flagged as a speech error.

Advantageously, the system can allow the miscue analysis to get more difficult over time. In some cases, the sensitivity feature can establish a baseline sensitivity level based on the number of speech errors during a first reading. For example, if a user has a speech error on most words, the sensitivity feature can determine that the sensitivity level is too high and can automatically adjust the sensitivity level to a lower level. Then, the sensitivity feature can gradually increase the sensitivity level over time, for example, based on the progress of the user. As an illustrative example, once the user has a 100% (e.g., no speech errors) on 10 reading sessions, the sensitivity feature may increase the sensitivity level by 5%.

In some cases, the sensitivity feature may be included in a productivity application or a digital assistant application. Productivity applications include reading and authoring tools for creating, editing, and consuming (e.g., by viewing or listening) documents, presentations, spreadsheets, databases, charts and graphs, images, video, audio, and the like. These applications can be in the form of a word processing software, spreadsheet software, personal information management (PIM) and email communication software, presentation programs, note taking/storytelling software, diagram and flowcharting software, document viewing software, web browser software, and the like. Examples of productivity applications include the MICROSOFT OFFICE suite of applications from Microsoft Corp., such as MICROSOFT WORD, MICROSOFT EXCEL, MICROSOFT ONENOTE, all registered trademarks of Microsoft Corp.

Personal digital assistants include software that prompts a user to perform an action, provides suggestions, and performs certain tasks including providing information to the user. Today, personal digital assistants have become personalized digital assistants, such as GOOGLE NOW a registered trademark of Google Inc., SIRI a registered trademark of Apple Inc., ALEXA a registered trademark of Amazon-.com, Inc., and CORTANA a registered trademark of Microsoft Corp. These assistants learn about a particular user and are able to interact with the user in a proactive manner by surfacing or verbalizing information that could be important to the user in some cases before the user specifically requests it. These assistants can further access the Internet and get answers to web or map searches.

In some cases, users may have difficulties interacting with the speech capabilities of an application. For example, speech recognition technology may have a hard time understanding users with speech impairments or speech disorders users with strong accents or foreign language speakers.

A speech disorder (or a speech impairment) is a communication disorder that adversely affects the person's ability to communicate. A person with a speech disorder may have problems creating or forming speech sounds needed to communicate with others.

There are many kinds of speech disorders that can affect a person. Some examples of speech disorders include, but are not limited to, apraxia, dysarthria, stuttering or stammering, cluttering, dysprosody, speech sound disorders (e.g., articulation disorders and phonemic disorders), lisping, and other voice disorders. The causes of speech disorders may include, for example, hearing disorders and deafness, neurological disorders, vocal cord damage, brain damage, muscle disorders or weakness, strokes, intellectual disabilities, or physical impairments.

Examples of symptoms experienced by people with speech disorders can include, but are not limited to, repeating sounds, adding extra sounds and words, elongating words, and distorting sounds when talking.

Advantageously, the described sensitivity feature may automatically adjust the sensitivity level to a less sensitive level, allowing these users to successfully interact with such applications. Indeed, the automatic adjustment of the sensitivity level allows for speech capabilities to be more inclusive and accessible to all types of users.

FIG. 1 illustrates an example operating environment in which various embodiments of the invention may be practiced. Referring to FIG. 1, a user 100 may interact with a user computing device 110 running an application 112 having an automatic speech sensitivity adjustment feature ("sensitivity feature") 113, and view a UI 114 of the application 112 displayed on a display 116 associated with the computing device 110.

Figure 5:
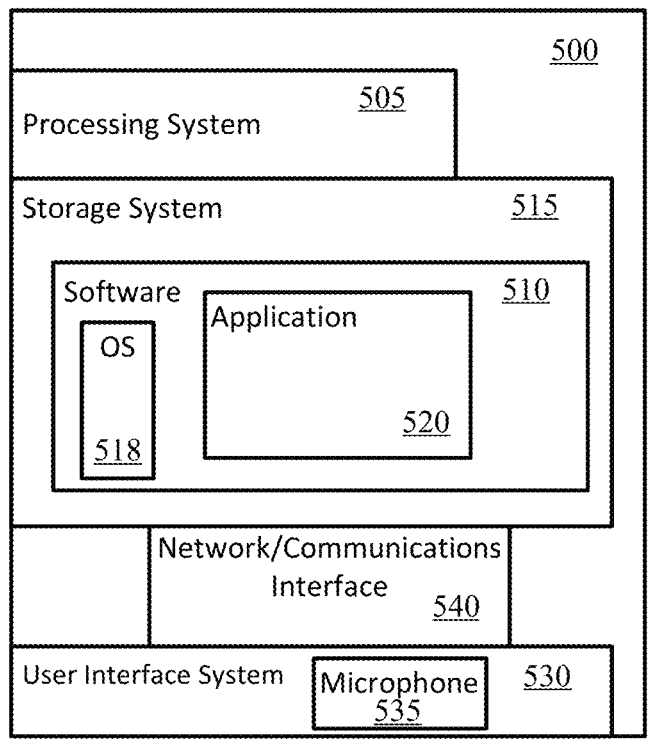
FIG. 5 illustrates components of an example computing device that may be used in certain embodiments described herein.

User computing device 110 includes an operating system (e.g., OS 118) and may be embodied such as described with respect to system 500 of FIG. 5 and configured to receive input from a user (e.g., user 100) through, for example, a microphone (e.g., microphone 120), keyboard, mouse, trackpad, touch pad, touch screen, or other input device. The display 116 of the user computing device 110 is configured to display one or more user interfaces (including UI 114) to the user 100.

The user device 110 can be, but is not limited to, a personal computer (e.g. desktop computer), laptop, personal digital assistant (PDA), video game device, mobile phone (or smart phone), tablet, slate, terminal, holographic-enabled device, and the like. It should be apparent that the user device 110 may be any type of computer system that provides its user the ability to load and execute software programs and the ability to access a network, such as network 130.

In some cases, application 112 may be a program for creating or consuming content, such as a productivity application, an education or learning application, or a personal digital assistant application. The application 112 may be an application with the sensitivity feature 113 or may be a web browser or front-end application that accesses the application with the sensitivity feature 113 over the Internet or other network (e.g., network 130). Thus, the application 112 may be a client-side application and/or a non-client side (e.g., a web-based) application.

In some cases, the sensitivity feature 113 may be integrated with OS 118. In some cases, the sensitivity feature 113 may be integrated with application 112 as an inherent feature of application 112 or as a plug in or extension for an existing application 112 to provide the sensitivity feature 113.

In some cases, application 112 utilizes one or more services 142 executed by server(s) 140 to perform certain of the processes for the automatic speech sensitivity adjustment. For example, server(s) 140 may host speech services. It should be understood that server(s) 140 and service(s) 142 may be provided by a single entity or by different entities. In some embodiments, the user device 110 will have an on-board speech recognition system or speech to text (STT) system.

Components (computing systems, storage resources, and the like) in the operating environment may operate on or in communication with each other over a network 130. The network 130 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 130 may include one or more connected networks (e.g., a multi-network environment) including public networks, such as the Internet, and/or private networks such as a secure enterprise private network. Access to the network 130 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a network. In a distributed-computing environment, program modules can be located in both local and remote computer-readable storage media.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Figure 2A:
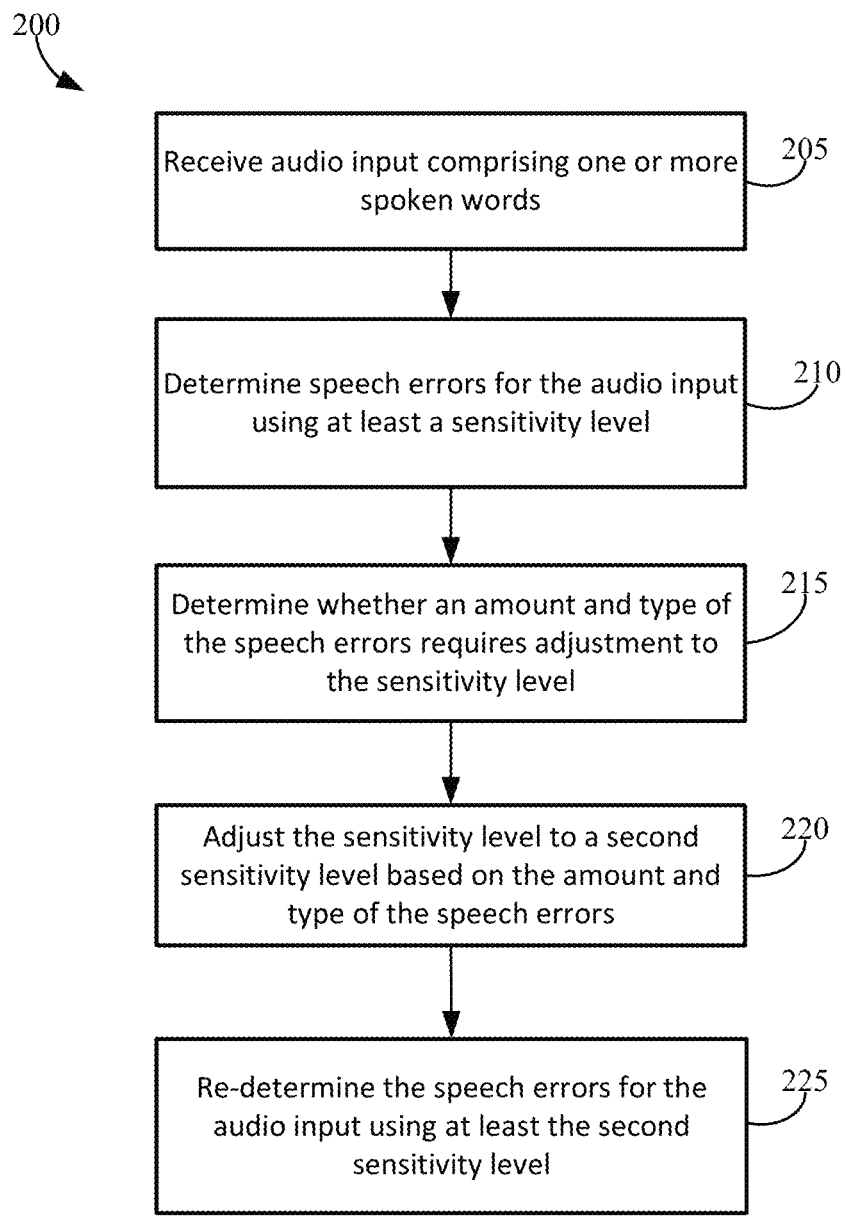
FIGS. 2A and 2B illustrate example processes for providing automatic speech sensitivity level adjustment according to certain embodiments of the invention.
Figure 2B:
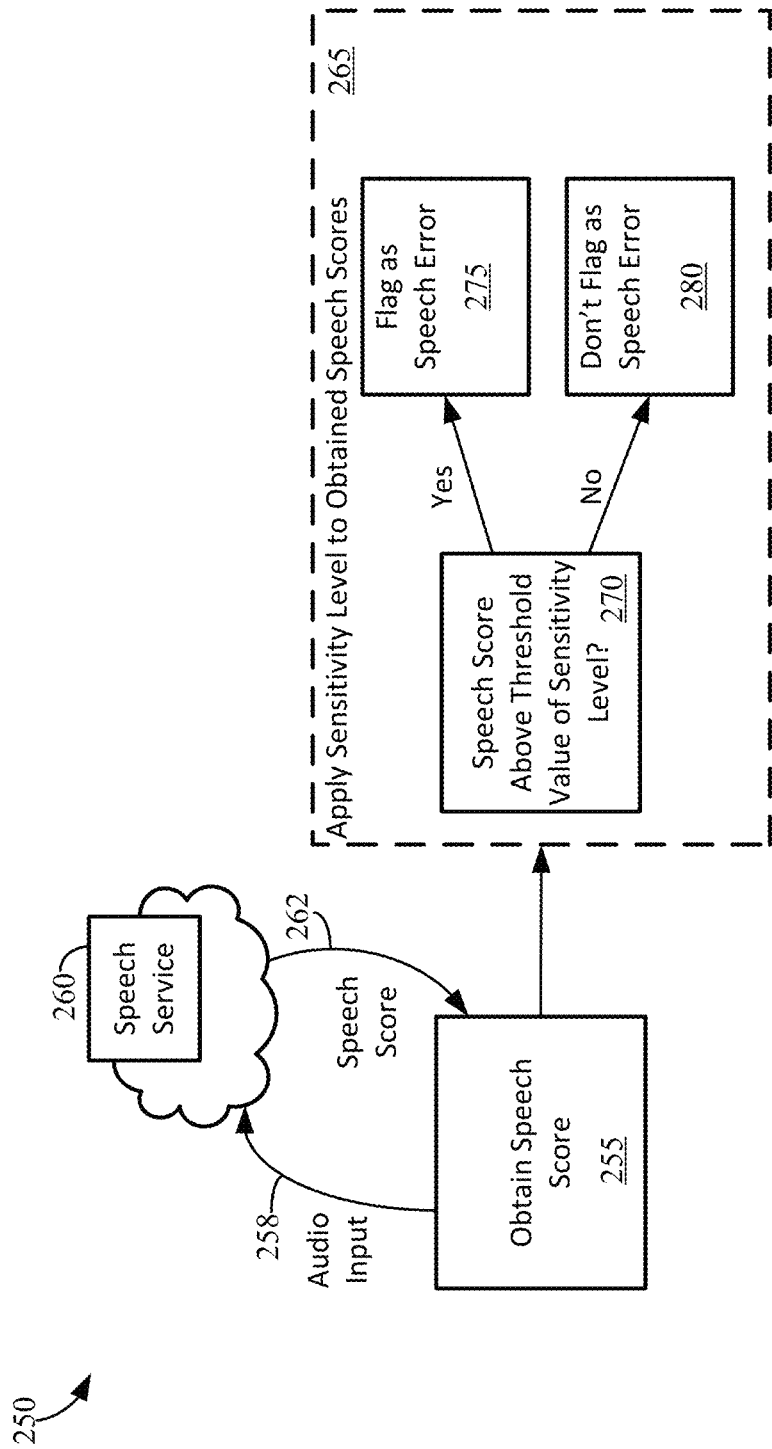

FIGS. 2A and 2B illustrate example processes for providing automatic speech sensitivity level adjustment according to certain embodiments of the invention. An automatic speech sensitivity adjustment feature ("sensitivity feature") performing process 200 described with respect to FIG. 2A and process 250 described with respect to FIG. 2B can be implemented by server, such as server(s) 140 as shown in FIG. 1, which can be embodied as described with respect to computing system 600 shown in FIG. 6 and even, in whole or in part, by a user computing device, such as user computing device 110 as shown in FIG. 1, which can be embodied as described with respect to computing system 500 as shown in FIG. 5.

Referring to process 200 of FIG. 2A, the sensitivity feature can receive (205) audio input. In some cases, the audio input may be one or more spoken words. In some cases, the audio input may be a natural language statement, sentence, or phrase. The audio input can be received through an audio input field provided by any suitable application, such as a digital assistant application, productivity application, or a learning application.

The sensitivity feature can determine (210) speech errors for the audio input using at least a sensitivity level. As previously described, examples of speech errors can include, but are not limited to, mispronunciation errors, repetition errors, insertion errors, substitution errors, omission errors, and hesitation errors. Each word may have more than one different type of speech error.

The sensitivity level determines how sensitive the sensitivity feature will be when indicating speech errors. In some cases, the sensitivity level may have multiple levels, including but not limited to, an ultra-level, a high level, a moderate level, and a low level. In some cases, the sensitivity level may be a value, such as a percentage. For example, the sensitivity level may range from 0 to 100, where 100 is the highest level (or 0 to 1, where 1 is the highest level).

In some cases, when the sensitivity level is at a lower level (e.g., moderate or low level or a sensitivity level of 0-50), the sensitivity feature is more lax on flagging speech errors. When the sensitivity level is at a higher level (e.g., ultra or high level or a sensitivity level of 50-100), the sensitivity feature may be more particular when flagging words with speech errors.

The sensitivity level can include different sensitivity levels for one or more of the speech errors. For example, the sensitivity level can include a mispronunciation sensitivity level, a repetition sensitivity level, an insertion sensitivity level, a substitution sensitivity level, an omission sensitivity level, a hesitation sensitivity level, or a combination thereof.

In some cases, the sensitivity level defines a threshold value in which the speech errors are determined. For example, an ultra-sensitivity level may define the threshold value as 60, a high sensitivity level may define the threshold value as 70, a moderate sensitivity level may define the threshold value as 80, and a low sensitivity level may define the threshold value at 90. In cases where the sensitivity level is a value, the threshold level value may be defined based on the sensitivity level value.

In some cases, the threshold value for one type of sensitivity level is different than another type of sensitivity level. For example, a high mispronunciation sensitivity level may define the threshold value as 70, whereas a high substitution sensitivity level may define the threshold value as 75. A further discussion on the threshold value will be provided in FIG. 2B.

In some cases, the speech errors for the audio input using at least a sensitivity level can be determined using process 250 of FIG. 2B. Referring to process 250 of FIG. 2B, the sensitivity feature can obtain (255) a speech score for each spoken word of the audio input.

In some cases, the speech scores are obtained from a locally processed speech recognition platform. In some cases, to obtain the speech score, the sensitivity feature can communicate the audio input 258 to a speech service 260 and receive the speech score 262 from the speech service 260.

The obtained speech score (e.g., speech score 262 received from the speech service 260) can include a mispronunciation score, a repetition score, an insertion score, a substitution score, an omission score, a hesitation score, or a combination thereof. The obtained speech score may include one or more types of speech scores. For example, an obtained speech score for a spoken word in the audio input may include a mispronunciation score and an insertion score.

In some cases, the speech score is a value, such as a confidence level that the word is an error). For example, a speech score may include mispronunciation score of 90 and an insertion score of 75. In this case, the mispronunciation score of 90 can indicate that the spoken word has a 90% chance of being a mispronunciation and the insertion score of 75 can indicate that the spoken word has a 75% chance of being an extra word inserted within an intended sentence.

It should be understood that the speech score may be obtained for any suitable unit of speech of the audio input. For example, the speech score can be obtained on a sentence unit, a phrase unit, or a phenome unit.

The sensitivity feature can apply (265) the sensitivity level to the obtained speech score to determine the speech errors for the audio input. In some cases, the sensitivity feature can, for each word of the one or more spoken words in the audio input, determine (270) if the speech score is above a threshold value. The threshold value is set by the sensitivity level. As previously discussed, the sensitivity level may define a threshold value in which the speech errors are determined. For example, an ultra-sensitivity level may define the threshold value as 60, a high sensitivity level may define the threshold value as 70, a moderate sensitivity level may define the threshold value as 80, and a low sensitivity level may define the threshold value at 90.

If the speech score is above the threshold value, the sensitivity feature can flag (275) the word of the one or more spoken words in the audio input as having a speech error. If the speech score is not above the threshold value, the sensitivity feature may not flag (280) the word of the one or more spoken words in the audio input as having a speech error.

In an example where the sensitivity level is a moderate sensitivity level with a threshold value of 80 and the obtained speech score for a spoken word includes a mispronunciation score of 90, a repetition score of 82, an insertion score of 50, a substitution score of 10, an omission score of 0, and a hesitation score of 0, the sensitivity feature can flag the spoken word as having a speech error. In this case, the spoken word would have a mispronunciation error and a repetition error.

As used herein, the speech score is a value indicating a confidence level that the word is an error. However, it should be understood that the speech score may also be a value indicating the rating of accuracy of a word. In this case, step 270 would include determining if the speech score is below a threshold value. Additionally, in this case, if the speech score is below the threshold value, the sensitivity feature would flag the word of the one or more spoken words in the audio input as having a speech error. If the speech score is not below the threshold value, the sensitivity feature would not flag the word of the one or more spoken words in the audio input as having a speech error.

Returning to FIG. 2A, the sensitivity feature can determine (215) whether an amount and type of the speech errors requires adjustment to the sensitivity level. The sensitivity feature can adjust (220) the sensitivity level to a second sensitivity level based on the amount and the type of the speech errors. In some cases, the sensitivity feature may set the sensitivity level at a default level, such as moderate.

The second sensitivity level may be lower or higher than the sensitivity level. For example, if the sensitivity level is a high sensitivity level and the second sensitivity level is lower than the sensitivity level, the sensitivity feature can adjust the sensitivity level to a medium sensitivity level or a low sensitivity level.

The amount and type of speech errors required for the adjustment to the sensitivity level may be any suitable amount and type. In some cases, the amount and type of speech errors required for the adjustment may be predetermined by the sensitivity feature.

In an example where the second sensitivity level is lower than the sensitivity level, the amount of speech errors required for adjustment may be 25% or more and the type of speech errors required for adjustment may be mispronunciation errors. In this example, if 25% or more of the total words in the audio input are mispronounced, the sensitivity feature can adjust the sensitivity level to the second sensitivity level that is lower than the sensitivity level.

In another example where the second sensitivity level is lower than the sensitivity level, the amount of speech errors required for adjustment may be 25% or more and the type of speech errors required for adjustment may be omission errors. In this example, if 25% or more of the total words in the audio input are omitted, the sensitivity feature can adjust the sensitivity level to the second sensitivity level that is lower than the sensitivity level.

In an example where the second sensitivity level is higher than the sensitivity level, the amount of speech errors required for adjustment may be 0 and the type of speech errors required for adjustment may be mispronunciation errors. In this example, if none of the total words in the audio input are mispronounced, the sensitivity feature can adjust the sensitivity level to the second sensitivity level that is higher than the sensitivity level.

In another example where the second sensitivity level is higher than the sensitivity level, the amount of speech errors required for adjustment may be 5% or less and the type of speech errors required for adjustment may be mispronunciation errors, insertion errors, substitution errors, and omission errors. In this example, if 5% or less of the total words in the audio input are mispronounced, inserted, substituted or omitted, the sensitivity feature can adjust the sensitivity level to the second sensitivity level that is higher than the sensitivity level.

In some cases, the sensitivity feature can determine to which level the second sensitivity level should be adjusted. In some cases, the sensitivity feature can determine the level of the second sensitivity level based on the amount of speech errors. In some cases, the sensitivity feature can determine the level of the second sensitivity level based on the type of speech errors.

Returning to the example where the second sensitivity level is lower than the sensitivity level when the amount of speech errors required for adjustment may be 25% or more and the type of speech errors required for adjustment may be mispronunciation errors, the sensitivity feature can determine the level of the second sensitivity level based on the amount of speech errors. As an example, if the amount of speech errors is 25%-50%, the second sensitivity level may be adjusted 25% lower or one level lower. In this case, if the sensitivity level is an ultra-sensitivity level, the sensitivity feature may adjust the second sensitivity level to be a high sensitivity level.

As another example, if the amount of speech errors is 51%-75%, the second sensitivity level may be adjusted 50% lower or 2 levels lower. In this case, if the sensitivity level is an ultra-sensitivity level, the sensitivity feature may adjust the second sensitivity level to be a moderate sensitivity level.

As yet another example, if the amount of speech errors is more than 75%, the second sensitivity level may be adjusted 75% lower or to the lowest level. In this case, if the sensitivity level is an ultra-sensitivity level, the sensitivity feature may adjust the second sensitivity level to be a low sensitivity level.

The sensitivity feature can re-determine (225) the speech errors for the audio input using at least the second sensitivity level. Similar to steps 265, 270, 275, and 280, the sensitivity feature can apply the second sensitivity level to the obtained speech score to re-determine the speech errors for the audio input. In some cases, the sensitivity feature can, for each word of the one or more spoken words in the audio input, determine if the speech score is above a threshold value set by the second sensitivity level.

If the speech score is above the threshold value set by the second sensitivity level, the sensitivity feature can flag the word of the one or more spoken words in the audio input as having a speech error. If the speech score is not above the threshold value set by the second sensitivity level, the sensitivity feature may not flag the word of the one or more spoken words in the audio input as having a speech error.

In some cases, the sensitivity feature can surface a visual indication of each of the determined speech errors in an application. For example, during a miscue analysis performed in, for example, an education or learning application, the sensitivity feature may surface visual indication of each of the determined speech errors. The sensitivity feature can surface a different visual indication for each type of speech error. For example, each type of speech error may have a different colored visual indication. A further illustration of this example is provided in and described with respect to FIGS. 3A-3C.

In some cases, the sensitivity feature can determine one or more reading or speech tools that correspond to the determined speech errors and provide the one or more reading or speech tools for a display of an application.

In some cases, the sensitivity feature accesses a mappings data resource to determine the reading or speech tools that correspond to the determined speech errors. The mappings data resource may include a plurality of speech errors and corresponding speech or reading tools. A further illustration of this example is provided in and described with respect to FIGS. 3E and 3D.

In some cases, the sensitivity feature can apply the determined speech errors to an application. For example, the sensitivity feature may provide the determined speech errors to an application. In an example where the application is a personal digital assistant application, the application may use the determined speech errors to adjust a set of results provided to the user. A further illustration of this example is provided in and described with respect to FIGS. 4A-4C.

In another example, the determined speech errors may be used in analytics for an application. For example, the speech errors for each student in a class may be analyzed and displayed in a dashboard in an education or learning application for a teacher to compare.

FIGS. 3A-3E illustrate example scenarios for applications with an automatic speech sensitivity level adjustment feature according to an embodiment of the invention. A user may be viewing content 310 via a user interface 305 of an application 300, such as a productivity application or education/learning application, having an automatic speech sensitivity adjustment feature ("sensitivity feature"), on their computing device (e.g., device 110 of FIG. 1, which may be embodied, for example, as system 500 described with respect to FIG. 5).

Figure 3A:
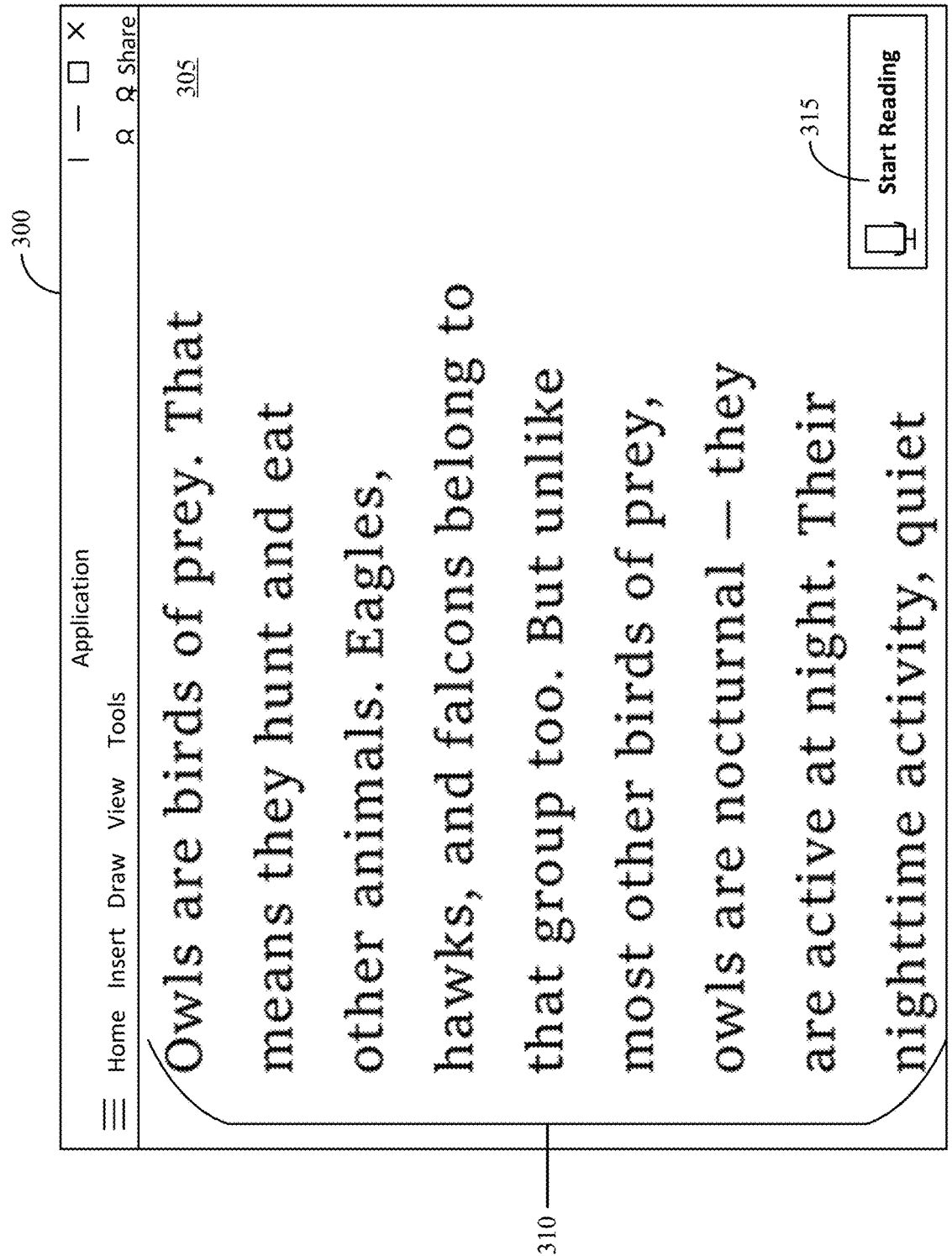
Figure 3B:
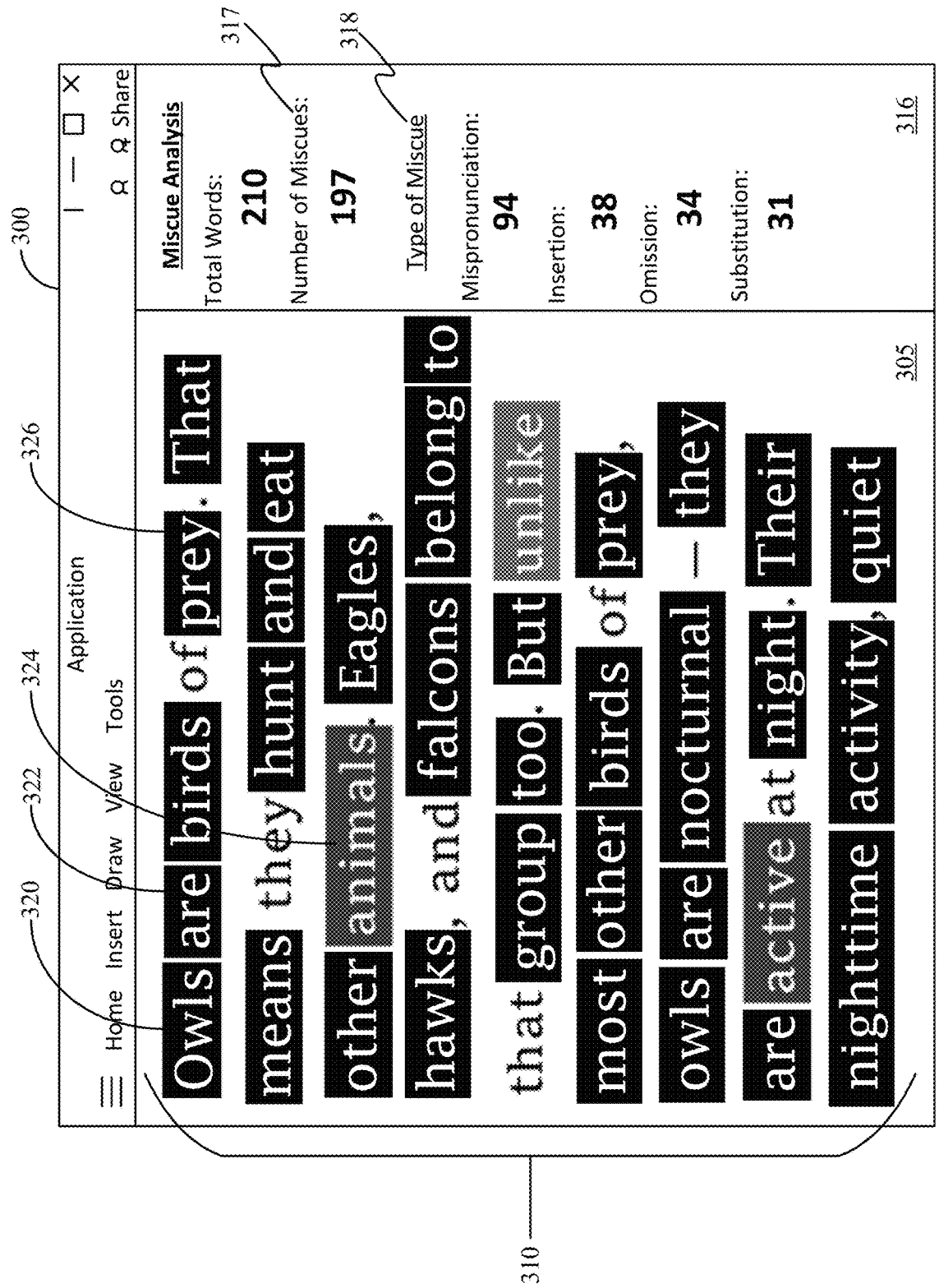

It should be understood that the sensitivity feature of the application 300 may be initiated by any suitable method—directly or indirectly performed by a user—and the illustrations of FIGS. 3A-3B are meant to be illustrative of some of the mechanisms to initiate the sensitivity feature. Once initiated, the sensitivity feature can automatically adjust the sensitivity as needed. The sensitivity feature may be part of a background process or 'always running' type of process.

Figure 3D:
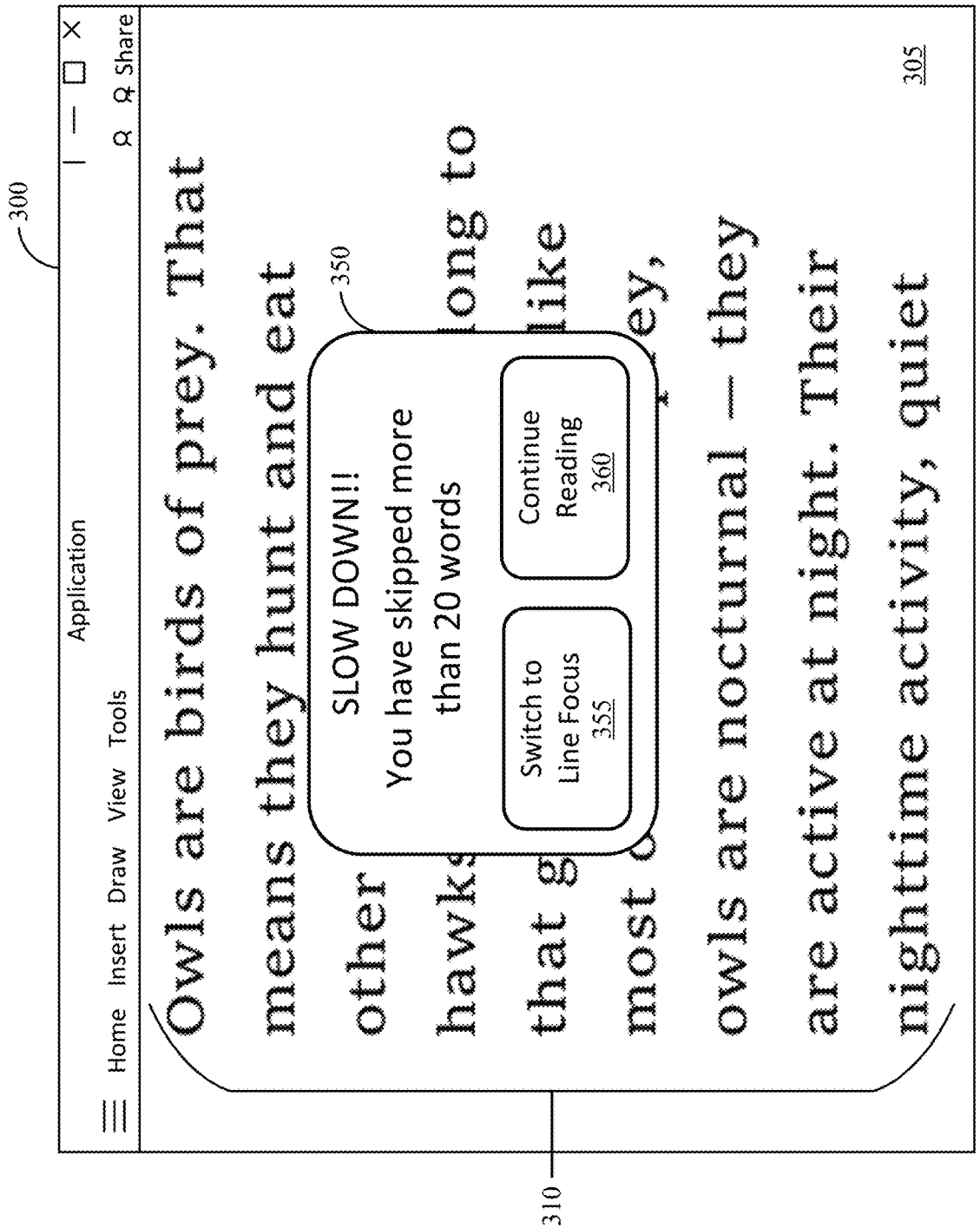
Figure 3E:
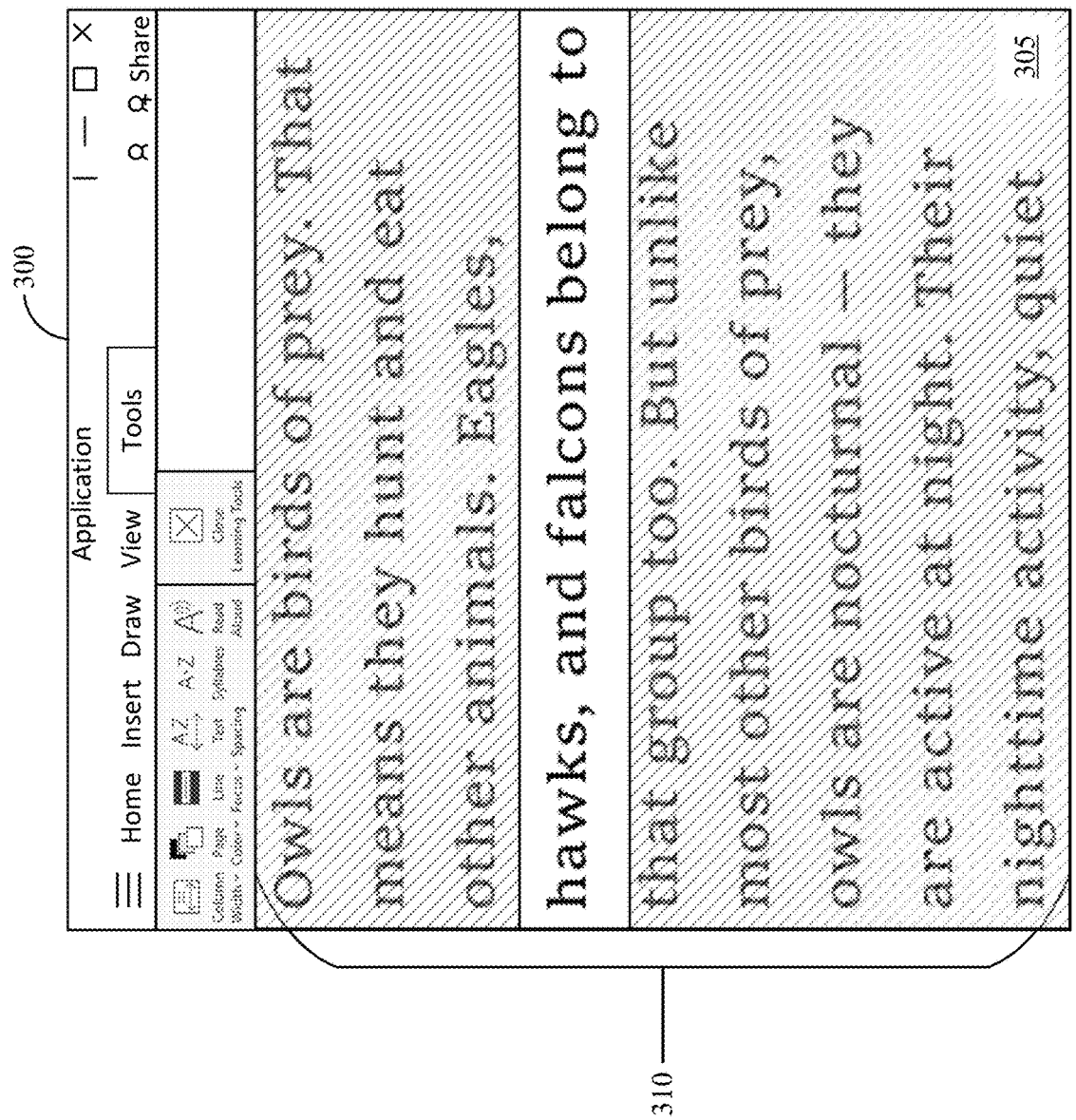

In the illustrative example, the content 310 is a reading assignment about owls. The user may select a reading command 315 and start an oral reading of the content 310. As the user is orally reading the content 310, the application 300 having the sensitivity feature may perform a miscue analysis (as shown in FIGS. 3B and 3C) or provide one or more reading or speaking tools for display (as shown in FIGS. 3D and 3E).

The application 300 having the sensitivity feature can receive audio input as a user orally reads the content 310 of the reading assignment. While the user is orally reading the content 310 the sensitivity feature may perform processes 200 and 250 described with respect to FIGS. 2A and 2B.

Referring to FIG. 3B, the sensitivity feature may determine speech errors in the oral reading of the content 310 using at least a sensitivity level. In this case, a miscue analysis is performed on the oral reading of the content 310, and each speech error (e.g., miscue) is flagged. Visual indications (e.g., visual indication 320, visual indication 322, visual indication 324, and visual indication 326) of each of the speech errors are surfaced within the content 310. The visual indication for each type of speech error is surfaced in a different color. A miscue analysis user interface 316 is displayed within the application 300 showing the results of the miscue analysis, such as the total number of miscues 317 and type of miscues 318.

In the illustrated example of FIG. 3B, the sensitivity level is a default level set to a high sensitivity level. As can be seen, most words in the content 310 include a visual indication of a speech error. In this case, the total number of miscues 317 is "197."

Referring to FIG. 3C, based on the thresholds on which the sensitivity feature is operating, the sensitivity feature adjusts the sensitivity level used in FIG. 3B to a second sensitivity level and re-determines the speech input for the audio input (oral reading of content 310). The sensitivity level is adjusted based on the amount (e.g., "197" miscues) and type of speech errors determined during the miscue analysis described with respect to FIG. 3B.

In the illustrated example of FIG. 3C, the second sensitivity level is a low sensitivity level. As can be seen, once the speech errors are re-determined using the second sensitivity level, the number of words flagged with speech errors (e.g., miscues) are reduced. In this case, the total number of miscues 317 is "21." Visual indications (e.g., visual indication 324, visual indication 328, and visual indication 328) of each of the speech errors are surfaced within the content 310.

Referring to FIG. 3D, the sensitivity feature may determine speech errors in the oral reading of the content 310 using at least a sensitivity level. The sensitivity feature can determine one or more reading or speaking tools that correspond to the determined speech errors providing the one or more reading or speaking tools for display of the application 300.

In the illustrative example of FIG. 3D, the sensitivity feature determine that 20 words included an omission error. The sensitivity feature can determine that a reading tool a corresponds to the determined speech errors (e.g., the omission errors) includes a suggestion for the reader to slow down and/or enter line focus mode. The sensitivity feature displays a reading suggestion 350 to the user. The reading suggestion 350 displays a message stating "SLOW DOWN!! You have skipped more than 20 words" and includes a command to switch to Line Focus (e.g., command 355) and a command to continue reading (e.g., command 360).

Referring to FIG. 3E, the user selected the command to switch to Line Focus (e.g., command 355) in FIG. 3D and the content 310 in application 300 is displayed in line focus mode.

Figure 4A:
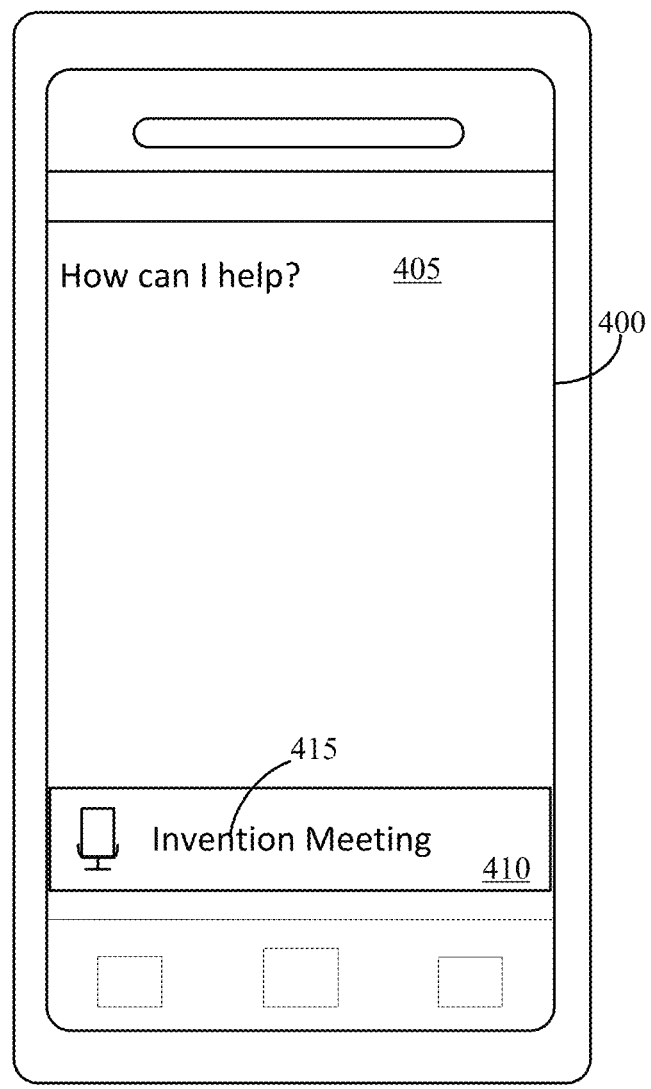
FIGS. 4A-4C illustrate example scenarios for a digital assistant application with an automatic speech sensitivity level adjustment feature according to certain embodiments of the invention.
Figure 4B:
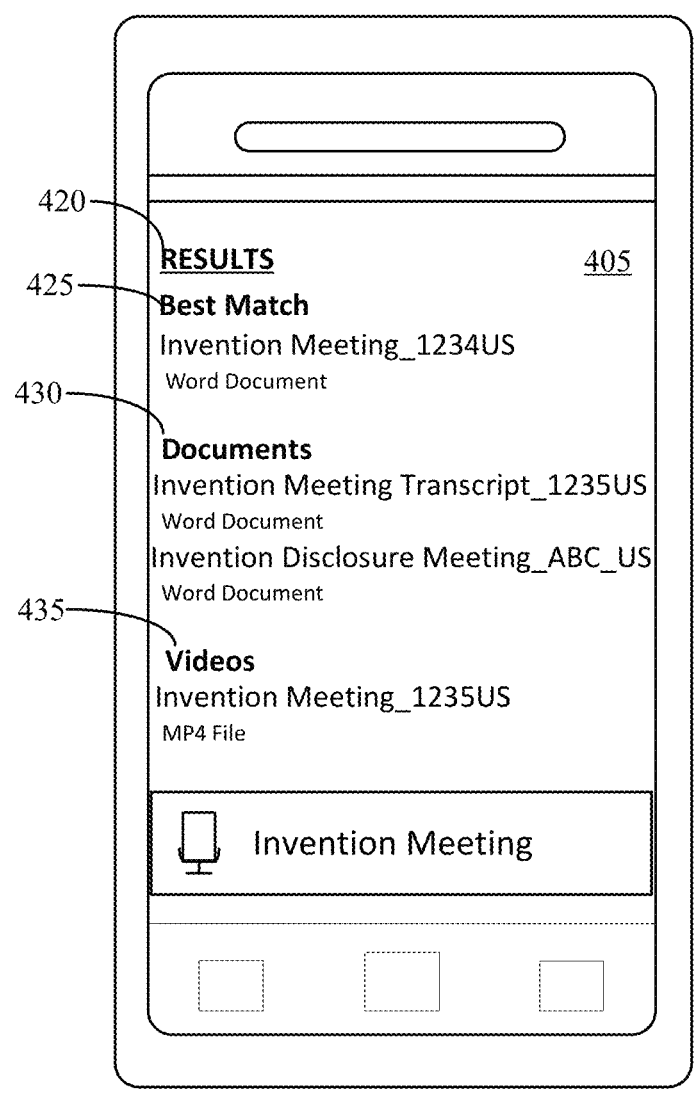
Figure 4C:
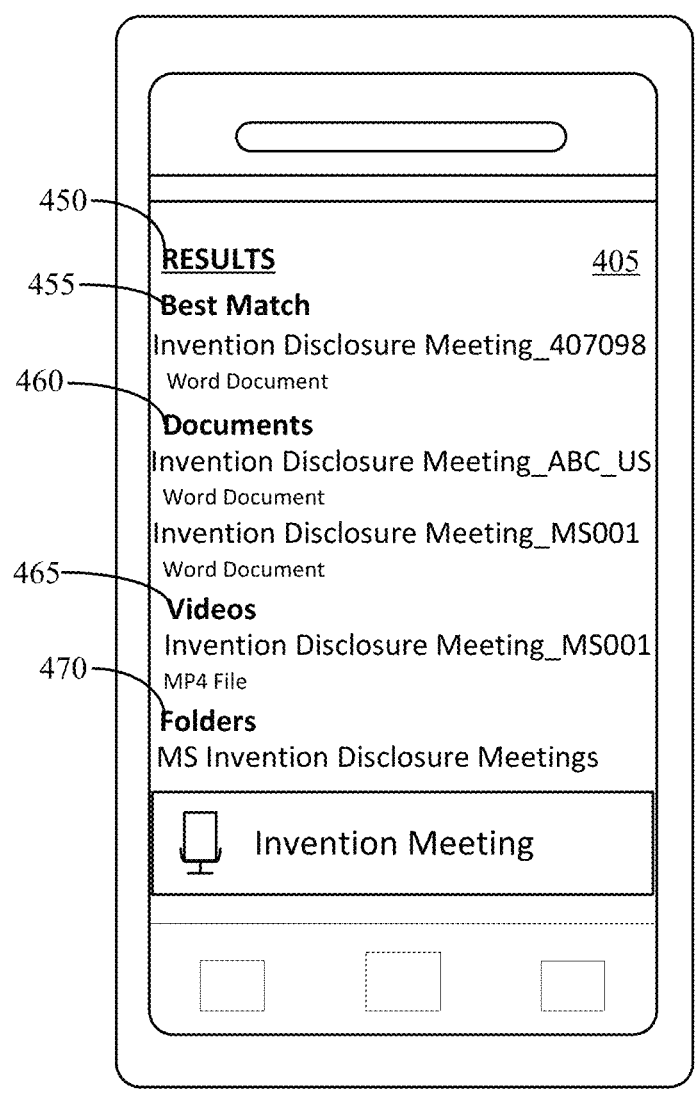

FIGS. 4A-4C illustrate example scenarios for a digital assistant application with an automatic speech sensitivity level adjustment feature according to certain embodiments of the invention. A user may open a user interface 405 of an application 400, such as a personal digital assistant application, having an automatic speech sensitivity adjustment feature ("sensitivity feature"), on their mobile device (e.g., device 110 of FIG. 1, which may be embodied, for example, as system 500 described with respect to FIG. 5). The user interface 405 can include an input field 410 for receiving audio input.

As the user provides the audio input 415, process 200 as described with respect to FIG. 2A or process 250 as described with respect to FIG. 2B can be initiated. For example, the sensitivity feature can receive the audio input (e.g., step 205), determine speech errors for the audio input using at least a sensitivity level (e.g., step 210), determine whether an amount and type of the speech errors required adjustment to the sensitivity level (e.g., step 215), adjust the sensitivity level to a second sensitivity level based on the amount and type of the speech errors (e.g., step 220), and determine the speech errors for the audio input using at least the second sensitivity level.

In the illustrative example, the application 400 is a personal digital assistant application. The user can provide audio input 415 in an audio input field 410 of the user interface 405 and be presented with a list of results based on audio input 415. In this example, the personal digital assistant application provides any documents the user has saved locally (or in a mapped online resource) related to the audio input 415.

Referring to FIG. 4A, the user has said, into the device microphone, the phrase "invention meeting" as the audio input 415 and the text of the audio input is displayed in the audio input field 410. Of course, whether or not the text of the speech is provided to the user in response to receiving the audio input is simply a matter of design choice and such a display can be omitted depending on the user interface.

Referring to FIG. 4B, a list of results 420 is displayed in the user interface 405. The list of results 420 include a best match result 425 of an "Invention Meeting_1234US" word document, documents results 430, and video results 435.

Referring to FIG. 4C, the sensitivity feature may have identified that most of the user's documents made reference to "invention disclosure meeting" and that the user uttered a speech error of omission. In such a case, the sensitivity feature may, based on the identification of the speech error, adjust the sensitivity level to be less sensitive to omission errors and re-determine the speech errors for the audio input 415. In this case, the application 400 (e.g., the personal digital assistant application) can update the list of results (e.g., results 420 described in FIG. 4B) using a sensitivity level that is less sensitive to omission errors and perform a search based on "Invention Disclosure Meeting" instead of "Invention Meeting." As can be seen, results 450 include a best match result 455 of an "Invention Disclosure Meeting_407098" Word document, document results 460, video results 465, and folders results 470.

Figure 6:
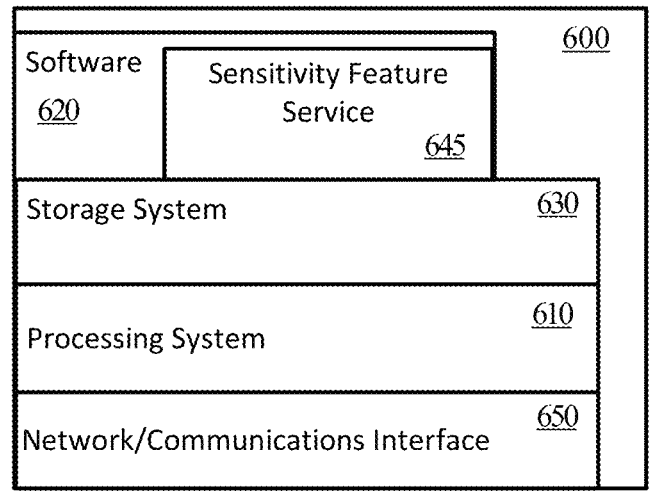
FIG. 6 illustrates components of an example computing system that may be used to implement certain methods and services described herein.

FIG. 5 illustrates components of an example computing device that may be used in certain embodiments described herein; and FIG. 6 illustrates components of an example computing system that may be used to implement certain methods and services described herein.

Referring to FIG. 5, system 500 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 500 may be incorporated to implement a particular computing device.

System 500 includes a processing system 505 of one or more processors to transform or manipulate data according to the instructions of software 510 stored on a storage system 515. Examples of processors of the processing system 505 include general purpose central processing units, application specific processors, and logic devices, as well as any other type of processing device, combinations, or variations thereof. The processing system 505 may be, or is included in, a system-on-chip (SoC) along with one or more other components such as network connectivity components, sensors, video display components.

The software 510 can include an operating system 518 and application programs such as an application 520 that calls the sensitivity feature service as described herein (and which may also be included as part of software 510, depending on implementation). Device operating systems 518 generally control and coordinate the functions of the various components in the computing device, providing an easier way for applications to connect with lower level interfaces like the networking interface.

Storage system 515 may comprise any computer readable storage media readable by the processing system 505 and capable of storing software 510 including the application 520 (and in some cases the sensitivity feature service).

Storage system 515 may include volatile and nonvolatile memories, removable and non-removable media implemented in any method or technology for storage of information, such as computer readable instructions, data structures, program modules, or other data. Examples of storage media of storage system 515 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

Storage system 515 may be implemented as a single storage device or may be implemented across multiple storage devices or sub-systems co-located or distributed relative to each other. Storage system 515 may include additional elements, such as a controller, capable of communicating with processing system 505.

Software 510 may be implemented in program instructions and among other functions may, when executed by system 500 in general or processing system 505 in particular, direct system 500 or the one or more processors of processing system 505 to operate as described herein.

The system can further include user interface system 530, which may include input/output (I/O) devices and components that enable communication between a user and the system 500. User interface system 530 can include input devices such as a mouse (not shown), track pad (not shown), keyboard (not shown), a touch device (not shown) for receiving a touch gesture from a user, a motion input device (not shown) for detecting non-touch gestures and other motions by a user, a microphone 535 for detecting speech, and other types of input devices and their associated processing elements capable of receiving user input.

The user interface system 530 may also include output devices such as display screen(s), speakers, haptic devices for tactile feedback, and other types of output devices. In certain cases, the input and output devices may be combined in a single device, such as a touchscreen, or touch-sensitive, display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form.

The user interface system 530 may also include user interface software and associated software (e.g., for graphics chips and input devices) executed by the OS in support of the various user input and output devices. The associated software assists the OS in communicating user interface hardware events to application programs using defined mechanisms. The user interface system 530 including user interface software may support a graphical user interface, a natural user interface, or any other type of user interface. For example, the user interfaces for the application 520 described herein may be presented through user interface system 530.

Network/communications interface 540 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the operating system 518, which informs applications of communications events when necessary.

Certain aspects described herein, such as those carried out by the sensitivity feature service described herein may be performed on a system such as shown in FIG. 6. Referring to FIG. 6, system 600 may be implemented within a single computing device or distributed across multiple computing devices or sub-systems that cooperate in executing program instructions. The system 600 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 600 can include a processing system 610, which may include one or more processors and/or other circuitry that retrieves and executes software 620 from storage system 630. Processing system 610 may be implemented within a single processing device but may also be distributed across multiple processing devices or sub-systems that cooperate in executing program instructions.

Storage system(s) 630 can include any computer readable storage media readable by processing system 610 and capable of storing software 620. Storage system 630 may be implemented as a single storage device but may also be implemented across multiple storage devices or sub-systems co-located or distributed relative to each other. Storage system 630 may include additional elements, such as a controller, capable of communicating with processing system 610.

Software 620, including sensitivity feature service 645, may be implemented in program instructions and among other functions may, when executed by system 600 in general or processing system 610 in particular, direct the system 600 or processing system 610 to operate as described herein for the sensitivity feature service 645 (and its various components and functionality).

System 600 may represent any computing system on which software 620 may be staged and from where software 620 may be distributed, transported, downloaded, or otherwise provided to yet another computing system for deployment and execution, or yet additional distribution.

In embodiments where the system 600 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communications interface 650 may be included, providing communication connections and devices that allow for communication between system 600 and other computing systems (not shown) over a communication network or collection of networks (not shown) or the air.

Certain techniques set forth herein with respect to the application and/or sensitivity feature service may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of operating a learning application, the method comprising:
   receiving, at a computing device, audio input from a user comprising one or more spoken words from a reading passage read aloud by the user while performing a reading assignment from the learning application;
   evaluating the audio input from the user for a first set of speech errors using at least a first sensitivity level, wherein evaluating the audio input from the user for the first set of speech errors comprises evaluating the audio input from the user for at least one type of speech error;
   determining that a number of speech errors in the audio input is above a threshold identified in the learning application;
   upon determining that the number of speech errors is above the threshold, decreasing the first sensitivity level to a second sensitivity level based at least on the number of speech errors in the audio input, the second sensitivity level being less sensitive than the first sensitivity level;
   re-evaluating the audio input from user for a second set of speech errors using at least the second sensitivity level; and
   surfacing, in a user interface of the learning application on the computing device, a visual indication of at least one speech error of the second set of speech errors.

2. The method of claim 1, wherein evaluating the audio input from the user for the at least one type of speech error comprises evaluating the audio input from the user for the at least one type of speech error from a group consisting of substitution, insertion, hesitation, omission, correction, and repetition.

3. The method of claim 1, wherein decreasing the first sensitivity level to the second sensitivity level is further based on a type of speech errors in the audio input.

4. The method of claim 1, wherein evaluating the audio input from the user for the first set of speech errors using at least the first sensitivity level comprises:
   obtaining a speech score for each spoken word of the audio input; and
   applying the first sensitivity level to the obtained speech score to determine the first set of speech errors.

5. The method of claim 4, wherein the speech score comprises at least one score from a group consisting of a repetition score, an insertion score, a substitution score, an omission score, and a hesitation score.

6. The method of claim 4, wherein obtaining the speech score for each spoken word of the audio input comprises:
   communicating the audio input to a speech service; and
   receiving the speech score for each spoken word of the audio input from the speech service.

7. The method of claim 6, wherein applying the first sensitivity level to the obtained speech score to determine the first set of speech errors comprises:
   for each word of the one or more spoken words in the audio input, determining if the speech score is above a speech score threshold value, the speech score threshold value being set by the first sensitivity level; and
   if the speech score is above the speech score threshold value, flagging a word of the one or more spoken words in the audio input as having a speech error.

8. The method of claim 1, further comprising:
   displaying the reading passage in the user interface of the learning application; and
   upon evaluating the audio input from the user for the second set of speech errors, surfacing the visual indication of the at least one speech error of the second set of speech errors in the user interface of the learning application in association with corresponding content of the displayed reading passage.

9. The method of claim 1, further comprising:
   determining one or more learning tools that correspond to the at least one speech error of the second set of speech errors; and
   surfacing, in the user interface of the learning application, the one or more learning tools.

10. A system comprising:
    a processing system;
    a storage system; and
    instructions stored on the storage system that when executed by the processing system direct the processing system to at least:
    receive audio input from a user comprising one or more spoken words from a reading passage read aloud by the user while performing a reading assignment from a learning application;
    evaluate the audio input from the user for a first set of speech errors using at least a first sensitivity level, wherein evaluating the audio input from the user for the first set of speech errors comprises evaluating the audio input from the user for at least one speech error;
    determine that a number of speech errors in the audio input is above a threshold identified in the learning application;
    upon determining that the number of speech errors is above the threshold, decrease the first sensitivity level to a second sensitivity level based at least on the number of speech errors in the audio input, the second sensitivity level being less sensitive than the first sensitivity level;

evaluate the first set of speech errors for the audio input using at least the second sensitivity level to determine a second set of speech errors; and cause display of, in a user interface of the learning application, a visual indication of at least one speech error of the second set of speech errors.

11. The system of claim 10, wherein the second set of speech errors has fewer speech errors than the first set of speech errors.

12. The system of claim 10, wherein evaluating the audio input from the user for the at least one speech error comprises evaluating the audio input from the user for at least one type of speech error from a group consisting of substitution, insertion, hesitation, omission, correction, and repetition.

13. The system of claim 10, wherein the instructions, to evaluate the audio input from the user for the first set of speech errors using at least the first sensitivity level, direct the processing system to:

obtain a speech score for each spoken word of the audio input, wherein the speech score comprises at least one score from the group consisting of a repetition score, an insertion score, a substitution score, an omission score, and a hesitation score; and apply the first sensitivity level to the obtained speech score to determine the first set of speech errors.

14. The system of claim 13, wherein the instructions, to apply the first sensitivity level to the obtained speech score to determine the first set of speech errors, direct the processing system to:

for each word of the one or more spoken words in the audio input, determine if the speech score is above a speech score threshold value, the speech score threshold value being set by the first sensitivity level; and if the speech score is above the speech score threshold value, flagging a word of the one or more spoken words in the audio input as having a speech error.

15. A computer-readable storage medium having instructions stored thereon that, when executed by a processing system, perform a method comprising:

receiving audio input from a user comprising one or more spoken words from a reading passage read aloud by the user while performing a reading assignment from a learning application;

evaluating the audio input from the user for a first set of speech errors using at least a first sensitivity level, wherein evaluating the audio input from the user for the first set of speech errors comprises evaluating the audio input from the user for at least one type of speech error;

determining that a number of speech errors in the audio input is above a threshold identified in the learning application;

upon determining that the number of speech errors is above the threshold, decreasing the first sensitivity level to a second sensitivity level based at least on the number of speech errors in the audio input, the second sensitivity level being less sensitive than the first sensitivity level;

re-evaluating the audio input from user for a second set of speech errors using at least the second sensitivity level; and surfacing, in a user interface of the learning application, a visual indication of at least one speech error of the second set of speech errors.

16. The computer-readable storage medium of claim 15 wherein evaluating the audio input from the user for speech errors using at least the first sensitivity level comprises:

obtaining a speech score for each spoken word of the audio input; and applying the first sensitivity level to the obtained speech score to determine the first set of speech errors.

17. The method of claim 1, wherein the second set of speech errors has fewer speech errors than the first set of speech errors.

18. The method of claim 1, wherein evaluating the audio input from the user for the first set of speech errors further comprises evaluating the audio input from the user for at least one mispronunciation error by the user while reading the reading passage aloud.

19. The method of claim 9, wherein the one or more learning tools comprise one or more of a reading tool and a speaking tool.

20. The method of claim 9, wherein determining the one or more learning tools that correspond to the at least one speech error of the second set of speech errors comprises accessing a mappings data resource to identify at least one learning tool that corresponds to the at least one speech error of the second set of speech errors, wherein the mappings data resource includes corresponding learning tools for a plurality of speech errors.

* * * * *